(12) United States Patent
Griffin

(10) Patent No.: US 6,986,042 B2
(45) Date of Patent: Jan. 10, 2006

(54) COMPUTER SYSTEM OPERABLE TO REVERT TO A TRUSTED STATE

(75) Inventor: Jonathan Griffin, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 784 days.

(21) Appl. No.: 10/110,950

(22) PCT Filed: Aug. 17, 2001

(86) PCT No.: PCT/GB01/03712

§ 371 (c)(1),
(2), (4) Date: Apr. 16, 2002

(87) PCT Pub. No.: WO02/17076

PCT Pub. Date: Feb. 28, 2002

(65) Prior Publication Data

US 2002/0188763 A1    Dec. 12, 2002

(30) Foreign Application Priority Data

Aug. 18, 2000   (GB) ................................. 0020488

(51) Int. Cl.
*H04L 12/24*   (2006.01)
*H04L 12/26*   (2006.01)
(52) U.S. Cl. .................. 713/164; 714/13; 711/162
(58) Field of Classification Search ........ 713/164–167; 714/13, 41; 711/162; 707/204
See application file for complete search history.

(56) References Cited

U.S. PATENT DOCUMENTS 4,654,846 A  *  3/1987  Goodwin et al. ............. 714/13
4,965,714 A  *  10/1990  Knecht ........................ 700/82

5,345,590 A  *  9/1994  Ault et al. ..................... 718/1

(Continued)

FOREIGN PATENT DOCUMENTS

EP    0 997 807 A2    5/2000

(Continued)

OTHER PUBLICATIONS

Araki, et al., "A non-stop updating technique for device driver programs on the IROS platform," *Communications—Gateway to Globalization, Proceedings of the International Conference on Communications*, vol. 1, Jun. 18, 1995, pp. 88-92.

(Continued)

*Primary Examiner*—Matthew Smithers
*Assistant Examiner*—Tamara Teslovich

(57) ABSTRACT

When software is loaded into an operating system kernel and so has access the same memory space as the operating system a problem occurs if the operating system cannot determine in advance whether the operating system will afterwards be in a suitably trusted state or not. By using a high availability cluster in which each System Processing Unit (S1, S2) has a trusted device, it is possible to gain more trust and a more flexible approach to trust whilst maintaining the high availability properties of the cluster. Software can be loaded onto one of at least two computing platforms (S1) of a computing system. Another of the platforms (S2) performs integrity tests on the platform (S1) carrying the new software to check whether the platform (S1) is still in a trusted state. If the tests are passed, then the test results are signed and sent to the platform (S1) with the new software and the new software is copied onto the other computing platform (S2). If the tests are failed, then the first platform (S1) can either be rebooted or returned to the state of the testing platform (S2).

27 Claims, 10 Drawing Sheets

U.S. PATENT DOCUMENTS

| | | | | |
|---|---|---|---|---|
| 5,361,359 | A | | 11/1994 | Tajalli et al. ............... 395/700 |
| 5,680,547 | A | * | 10/1997 | Chang ......................... 709/222 |
| 5,844,986 | A | * | 12/1998 | Davis .......................... 713/187 |
| 6,330,670 | B1 | | 12/2001 | England et al. ................ 713/2 |
| 6,363,497 | B1 | * | 3/2002 | Chrabaszcz .................. 714/13 |

FOREIGN PATENT DOCUMENTS

| | | | |
|---|---|---|---|
| EP | 1030237 A1 | * | 8/2000 |
| WO | 00/48063 | | 8/2000 |
| WO | WO 00/48063 | | 8/2000 |

OTHER PUBLICATIONS

Anderson, R. and Markus Kuhn, "Tamper Resistance—a Cautionary Note," 16 pages, located at Internet address <www.cl.cam.ac.uk/~mgk25/tamper.html> (1996).

Intel, "Wired for Management Baseline specification v2.0," *Boot Integrity Services Application Programming Interface Version 1.0*, 64 pages (Dec. 28, 1998).

"Information technology-Security techniques-Entity Authentication—Part 3: Mechanisms using digital signature techniques," *ISO/IEC 9798-3*, 6 pages (1998).

Yee, B., "Using Secure Coprocessors," Doctoral thesis—Carnegie Mellon University, pp. 1-94 (May 1994).

"Building a Foundation of Trust in the PC," *Trusted Computing Platform Alliance*, pp. 1-7 (Jan. 2000).

"Information technology—Security techniques—Key management—Part 3: Mechanisms using asymmetric techniques," *ISO/IEC 11770-3*, pp. 1-34 (1999).

*Trusted Computing Platform Alliance (TCPA), Main Specification*, Version 1.0, pp. 1-284 (2000).

* cited by examiner

COMPUTER SYSTEM OPERABLE TO REVERT TO A TRUSTED STATE

This invention relates to a computer system operable to perform an operation and revert to a trusted state and to a method of operating a computer system to achieve the same.

A prior patent application, International Patent Application Publication No. WO 00/48063, entered into the US national phase as U.S. patent application Ser. No. 09/913,452 and incorporated herein by reference described the use of a Trusted Device (TD) or Trusted Platform Module (TPM) to enable verification of the integrity of computing apparatus by the reliable measurement and reliable reporting of integrity metrics. A TD/TPM conforms to the Trusted Computing Platform Alliance (TCPA) specification. Extracts of the above patent specification are included in the description. The description enables the verification of the integrity of the apparatus by either a local user or a remote entity. That prior patent application described a general method of reporting integrity metrics and verifying the correctness of the integrity of the computing apparatus by comparing reported values of metrics with proper values of metrics.

A "high availability cluster" is a grouping of servers having sufficient redundancy of software and hardware components that a failure will not disrupt the availability of computer services. The result of eliminating single points of failure in power, disk, System Processing Unit (SPU), networking, and software is a true high availability cluster, shown in FIG. 9 of the extract from "Clusters for High Availability", annexed hereto at pages 30 to 43 which describes the MC/ServiceGuard product from Hewlett-Packard which implements a high availability cluster.

A problem arises in cases where software is loaded into an operating system kernel, and so has access to the same memory space as the Operating System (OS), e.g. a kernel-level driver for a peripheral device. The problem occurs if the OS cannot determine in advance (i.e. before loading the software) whether the OS will afterwards be in a suitably trusted state or not. If the OS simply loads the software, the software may infect or cause damage to the running OS, such that the OS cannot detect the damage and can no longer be trusted. The damage cannot be undone, because there is no reliable way to roll back or revert to the previous trusted state of the OS, and the potentially damaged OS could not be trusted to make the decision to roll back or revert even if that were possible.

In the situation described above, a system with a TD cannot load the software without running the risk of ending up in an untrusted state.

It is an object of the present invention to address the problem set out above.

According to a first aspect of the present invention a computer system comprises at least two computing platforms each having a trusted device (TD), the computing platforms having a communications link therebetween, wherein the system is operable to move one or more applications from a first of the computing platforms to a second of the computing platforms;

to load software onto said first computing platform;

to perform integrity tests on the first platform; and if the integrity tests are passed the system is operable to move the applications back to the first computing platform and load the software on the second platform; and if the integrity tests are failed the system is operable to return the first computing platform to the state of the second platform.

The system may be operable to load software unknown to the computer system, which may be unknown in that the software does not have a trusted status with the computer system. The software may be a kernel driver.

The computer system may be operable to perform the integrity tests with the second platform.

The computer system is advantageously operable to load unknown or untrusted software onto one of the computing platforms and to assess the trustworthiness of the software without compromising the trusted state of the computer system as a whole. The trusted state of one of the computing platforms is potentially sacrificed, albeit temporarily, whilst maintaining the functioning capability of the other computing platform. Nevertheless, all clients of the [applications running on the] whole system are directed to the one computing platform which is known to be in a trusted state.

The second computing platform may be operable to digitally sign the results of the integrity tests with its TD, and may be operable to send those results to the first computing platform. The signed results may include the status of the second platform at the time of signing. The first computing platform may be operable to provide the digitally signed results to a third party, on receipt of a request for the digitally signed results.

A third party can thus verify the trustworthiness of the computer system, in particular the first computing platform.

In the event of the first computing platform failing the integrity tests, the first computing platform may be operable to be rebooted. Alternatively, the system may be operable to complete open transactions between third parties and the second computing platform, to save a copy of the active state of the second computing platform and restore that active state to the first computing platform.

According to a second aspect of the present invention a method of maintaining a trusted state in a computer system comprises:

moving one or more applications from a first computing platform having a trusted device (TD) to a second computing platform having a TD via a communications link of the computer system;

loading software onto the first computing platform;

performing integrity tests on the first computing platform; and if the integrity tests are passed the applications are moved back to the first computing platform and the software is loaded onto the second platform;

if the integrity tests are not passed the first computing platform is returned to the state of the second computing platform.

The software may be unknown to the computer system.

The integrity tests may be performed by the second computing platform.

The tests may involve a comparison with previous results obtained from the first computing platform, or may involve a comparison with the results of the same tests run on the second platform, which is in a trusted state.

The second computing platform may digitally sign the results of the integrity tests with its TD, and may send those results to the first computing platform. The first platform may use the signed results as an integrity metric.

The invention extends to a computer system programmed to perform the method of the second aspect.

A recordable medium carries a program operable to perform the method of the second aspect.

All of the features disclosed herein can be combined with any of the above aspects, in any combination.

BRIEF DESCRIPTION OF THE DRAWINGS

Preferred embodiments of the present invention will now be described, by way of example only, with reference to the accompanying drawings, of which.

Figure 1:
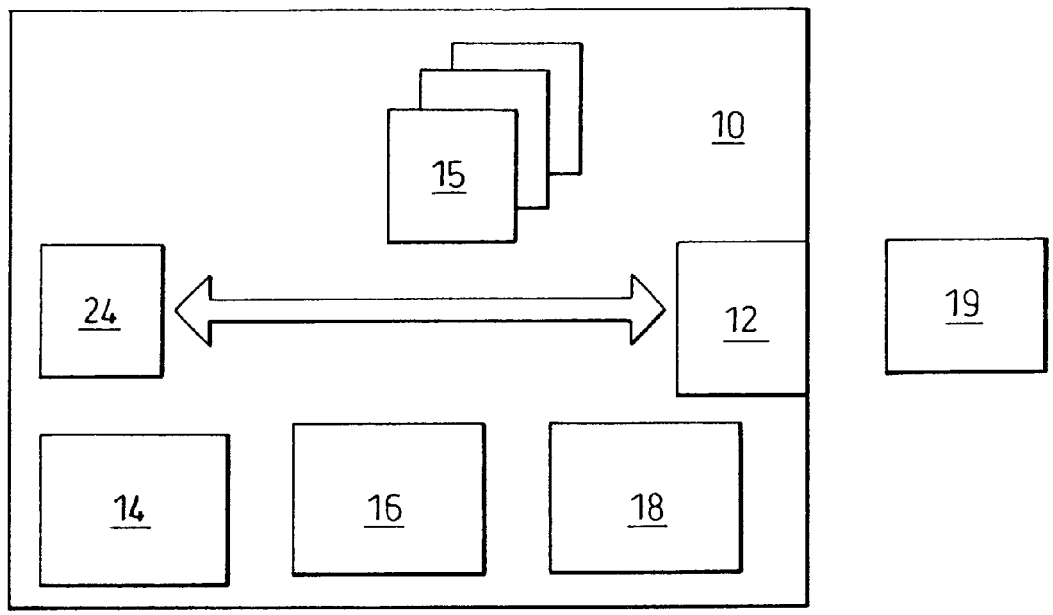
FIG. 1 is a diagram that illustrates a system capable of implementing embodiments of the present invention.

The following sections discuss a particular embodiment of the invention with respect to FIGS. 1 to 15. It should be noted that the architecture described in FIGS. 1 to 6 inclusive is that described in WO 00/48063 and is not part of this invention: these are included in order to understand better the invention itself.

The embodiment of a trusted platform as described in the prior patent application mentioned above, WO 00/48063, has as its central feature the incorporation into a computing platform of a physical trusted device (TD) whose function is to bind the identity of the platform to reliably measured data that provides an integrity metric of the platform. The identity and the integrity metric are compared with expected values provided by a trusted party (TP) that is prepared to vouch for the trustworthiness of the platform. If there is a match, the implication is that at least part of the platform is operating correctly, depending on the scope of the integrity metric.

A user verifies the correct operation of the platform before exchanging other data with the platform. A user does this by requesting the trusted device to provide its identity and an integrity metric. The identity metric of the platform as a whole can be obtained by obtaining the identity metric of the individual critical components of the platform from their respective CCRs. (Optionally the trusted device will refuse to provide evidence of identity if it itself was unable to verify correct operation of the platform.) The user receives the proof of identity and the identity metrics of the individual components, and compares them against values which it believes to be true. Those proper values are provided by the TP or another entity that is trusted by the user or can be set by the user himself. If data reported by the trusted device is the same as that provided by the TP, the user trusts the platform. This is because the user trusts the entity. The entity trusts the platform because it has previously validated the identity and determined the proper integrity metric of the platform.

Once a user has established trusted operation of the platform, he exchanges other data with the platform. For a local user, the exchange might be by interacting with some software application running on the platform. For a remote user, the exchange might involve a secure transaction. In either case, the data exchanged is 'signed' by the trusted device. The user can then have greater confidence that data is being exchanged with a platform whose behaviour can be trusted.

The trusted device uses cryptographic processes but does not necessarily provide an external interface to those cryptographic processes. Also, a most desirable implementation would be to make the trusted device tamperproof, to protect secrets by making them inaccessible to other platform functions and provide an environment that is substantially immune to unauthorised modification. Since tamper-proofing is impossible, the best approximation is a trusted device that is tamper-resistant, or tamper-detecting. The trusted devices, therefore, preferably consists of one physical component that is tamper-resistant. Techniques relevant to tamper-resistance are well known to those skilled in the art of security. These techniques include methods for resisting tampering (such as appropriate encapsulation of the trusted device), methods for detecting tampering (such as detection of out of specification voltages, X-rays, or loss of physical integrity in the trusted device casing), and methods for eliminating data when tampering is detected. It will be appreciated that, although tamper-proofing is a most desirable feature of the present invention, it does not enter into the normal operation of the invention and, as such, is beyond the scope of the present invention and will not be described in any detail herein.

The trusted device is preferably a physical one because it must be difficult to forge. It is most preferably tamper-resistant because it must be hard to counterfeit. It typically has an engine capable of using cryptographic processes because it is required to prove identity, both locally and at a distance, and it contains at least one method of measuring some integrity metric of the platform with which it is associated.

A trusted platform 10 is illustrated in the diagram in FIG. 1. The platform 10 includes the standard features of a keyboard 14, mouse 16 and visual display unit (VDU) 18, which provide the physical 'user interface' of the platform. This embodiment of a trusted platform also contains a smart card reader 12—a smart card reader is not an essential element of all trusted platforms, but is employed in various preferred embodiments described below. Along side the smart card reader 12, there is illustrated a smart card 19 to allow trusted user interaction with the trusted platform as shall be described further below. In the platform 10, there are a plurality of modules 15: these are other functional elements of the trusted platform of essentially any kind appropriate to that platform (the functional significance of such elements is not relevant to the present invention and will not be discussed further herein).

Figure 2:
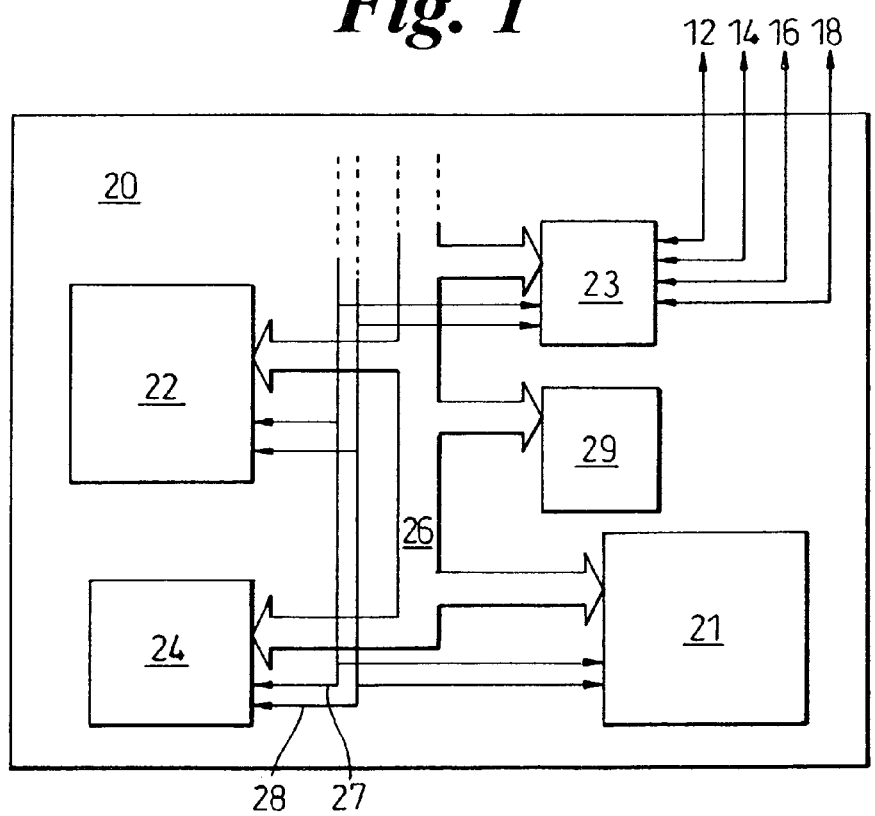
FIG. 2 is a diagram, which illustrates a motherboard including a trusted device arranged to communicate with a smart card via a smart card reader and with a group of functional components.

As illustrated in FIG. 2, the motherboard 20 of the trusted computing platform 10 includes (among other standard components) a main processor 21, main memory 22, a trusted device 24, a data bus 26 and respective control lines 27 and lines 28, BIOS memory 29 containing the BIOS program for the platform 10 and an Input/Output (IO) device 23, which controls interaction between the components of the motherboard and the smart card reader 12, the keyboard 14, the mouse 16 and the VDU 18. The main memory 22 is typically random access memory (RAM). In operation, the platform 10 loads the operating system, for example Windows NT™, into RAM from hard disk (not shown). Additionally, in operation, the platform 10 loads the processes or applications that may be executed by the platform 10 into RAM from hard disk (not shown).

Typically, in a personal computer the BIOS program is located in a special reserved memory area, the upper 64K of the first megabyte do the system memory (addresses FØØØh to FFFFh), and the main processor is arranged to look at this memory location first, in accordance with an industry wide standard.

The significant difference between the platform and a conventional platform is that, after reset, the main processor is initially controlled by the trusted device, which then hands control over to the platform-specific BIOS program, which in turn initialises all input/output devices as normal. After the BIOS program has executed, control is handed over as normal by the BIOS program to an operating system program, such as Windows NT (™), which is typically loaded into main memory 22 from a hard disk drive (not shown).

Clearly, this change from the normal procedure requires a modification to the implementation of the industry standard, whereby the main processor 21 is directed to address the trusted device 24 to receive its first instructions. This change may be made simply by hard-coding a different address into the main processor 21. Alternatively, the trusted device 24 may be assigned the standard BIOS program address, in which case there is no need to modify the main processor configuration.

It is highly desirable for the BIOS boot block to be contained within the trusted device 24. This prevents subversion of the obtaining of the integrity metric (which could otherwise occur if rogue software processes are present) and prevents rogue software processes creating a situation in which the BIOS (even if correct) fails to build the proper environment for the operating system.

Although, in the preferred embodiment to be described, the trusted device 24 is a single, discrete component, it is envisaged that the functions of the trusted device 24 may alternatively be split into multiple devices on the motherboard, or even integrated into one or more of the existing standard devices of the platform. For example, it is feasible to integrate one or more of the functions of the trusted device into the main processor itself, provided that the functions and their communications cannot be subverted. This, however, would probably require separate leads on the processor for sole use by the trusted functions. Additionally or alternatively, although in the present embodiment the trusted device is a hardware device that is adapted for integration into the motherboard 20, it is anticipated that a trusted device may be implemented as a 'removable' device, such as a dongle, which could be attached to a platform when required. Whether the trusted device is integrated or removable is a matter of design choice. However, where the trusted device is separable, a mechanism for providing a logical binding between the trusted device and the platform should be present.

Figure 3:
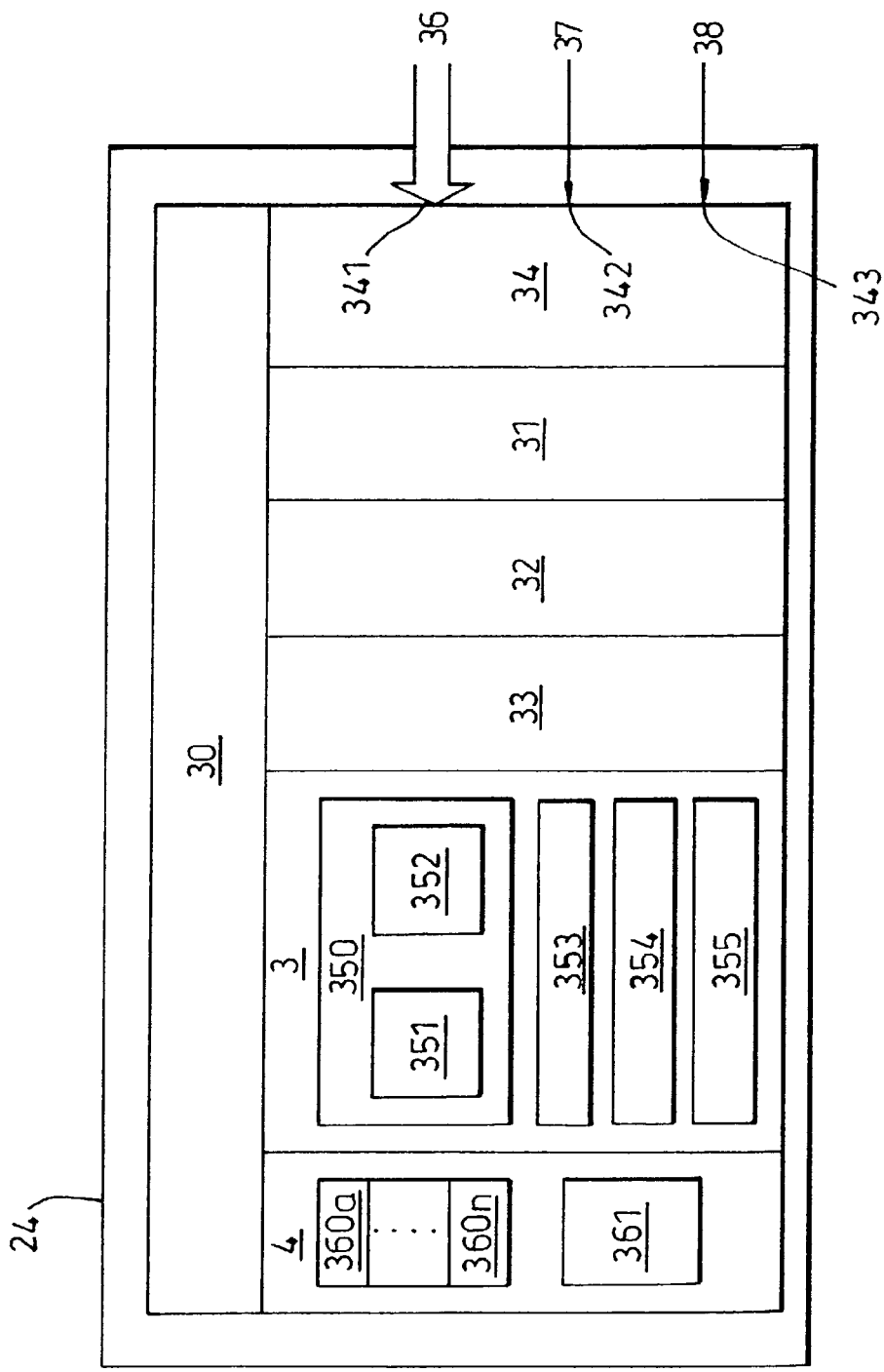
FIG. 3 is a diagram that illustrates the trusted device in more detail.

The trusted device 24 comprises a number of blocks, as illustrated in FIG. 3. After system reset, the trusted device 24 performs a secure boot process to ensure that the operating system of the platform 10 (including the system clock and the display on the monitor) is running properly and in a secure manner. During the secure boot process, the trusted device 24 acquires an integrity metric of the computing platform 10. The trusted device 24 can also perform secure data transfer and, for example, authentication between it and a smart card via encryption/decryption and signature/verification. The trusted device 24 can also securely enforce various security control policies, such as locking of the user interface.

Specifically, the trusted device comprises: a controller 30 programmed to control the overall operation of the trusted device 24, and interact with the other functions on the trusted device 24 and with the other devices on the motherboard 20; a measurement function 31 for acquiring the integrity metric from the platform 10; a cryptographic function 32 for signing, encrypting or decrypting specified data; an authentication function 33 for authenticating a smart card; and interface circuitry 34 having appropriate ports (36, 37 & 38) for connecting the trusted device 24 respectively to the data bus 26, control lines 27 and address lines 28 of the motherboard 20. Each of the blocks in the trusted device 24 has access (typically via the controller 30) to appropriate volatile memory areas 4 and/or non-volatile memory areas 3 of the trusted device 24. Additionally, the trusted device 24 is designed, in a known manner, to be tamper resistant.

For reasons of performance, the trusted device 24 may be implemented as an application specific integrated circuit (ASIC). However, for flexibility, the trusted device 24 is preferably an appropriately programmed micro-controller. Both ASICs and micro-controllers are well known in the art of microelectronics and will not be considered herein in any further detail.

One item of data stored in the non-volatile memory 3 of the trusted device 24 is a certificate 350. The certificate 350 contains at least a public key 351 of the trusted device 24 and an authenticated value 352 of the platform integrity metric measured by a trusted party (TP). The certificate 350 is signed by the TP using the TP's private key prior to it being stored in the trusted device 24. In later communications sessions, a user of the platform 10 can verify the integrity of the platform 10 by comparing the acquired integrity metric with the authentic integrity metric 352. If there is a match, the user can be confident that the platform 10 has not been subverted. Knowledge of the TP's generally-available public key enables simple verification of the certificate 350. The non-volatile memory 35 also contains an identity (ID) label 353. The ID label 353 is a conventional ID label, for example a serial number, that is unique within some context. The ID label 353 is generally used for indexing and labelling of data relevant to the trusted device 24, but is insufficient in itself to prove the identity of the platform 10 under trusted conditions.

The trusted device 24 is equipped with at least one method of reliably measuring or acquiring the integrity metric of the computing platform 10 with which it is associated. In the present embodiment, the integrity metric is acquired by the measurement function 31 by generating a digest of the BIOS instructions in the BIOS memory. Such an acquired integrity metric, if verified as described above, gives a potential user of the platform 10 a high level of confidence that the platform 10 has not been subverted at a hardware, or BIOS program, level. Other known processes, for example virus checkers, will typically be in place to check that the operating system and application program code has not been subverted.

The measurement function 31 has access to: non-volatile memory 3 for storing a hash program 354 and a private key 355 of the trusted device 24, and volatile memory 4 for storing acquired integrity metric in the form of a digest 361. In appropriate embodiments, the volatile memory 4 may also be used to store the public keys and associated ID labels 360a–360n of one or more authentic smart cards 19s that can be used to gain access to the platform 10.

In one preferred implementation, as well as the digest, the integrity metric includes a Boolean value, which is stored in volatile memory 4 by the measurement function 31, for reasons that will become apparent.

Figure 4:
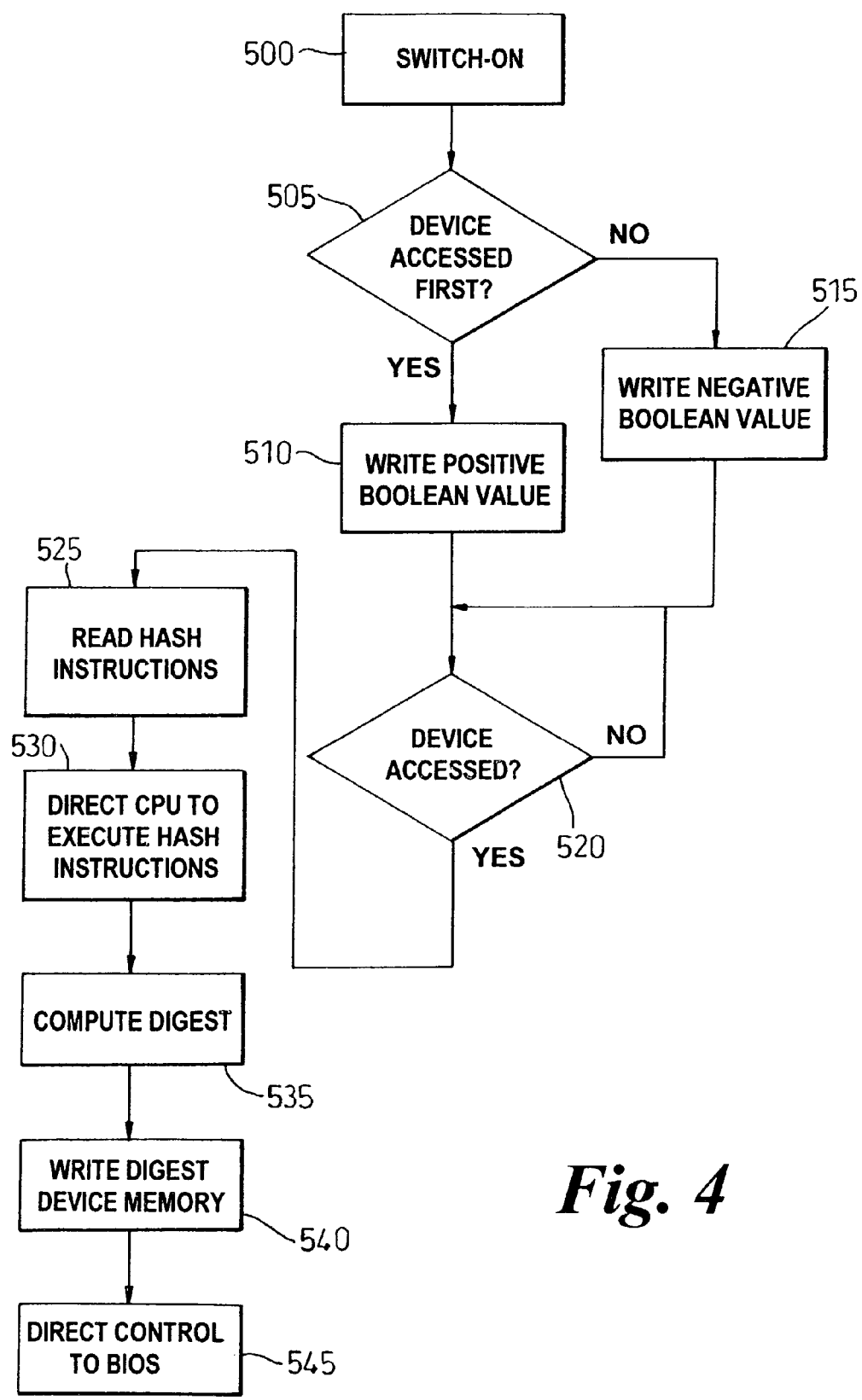
FIG. 4 is a flow diagram that illustrates the steps involved in acquiring an integrity metric of the computing apparatus.

A preferred process for acquiring an integrity metric will now be described with reference to FIG. 4.

In step 500, at switch-on, the measurement function 31 monitors the activity of the main processor 21 on the data, control and address lines (26, 27 & 28) to determine whether the trusted device 24 is the first memory accessed. Under conventional operation, a main processor would first be directed to the BIOS memory first in order to execute the BIOS program. However, in accordance with the present embodiment, the main processor 21 is directed to the trusted device 24, which acts as a memory. In step 505, if the trusted device 24 is the first memory accessed, in step 510, the measurement function 31 writes to volatile memory 3 a Boolean value which indicates that the trusted device 24 was the first memory accessed. Otherwise, in step 515, the measurement function writes a Boolean value which indicates that the trusted device 24 was not the first memory accessed.

In the event the trusted device 24 is not the first accessed, there is of course a chance that the trusted device 24 will not be accessed at all. This would be the case, for example, if the main processor 21 were manipulated to run the BIOS program first. Under these circumstances, the platform would operate, but would be unable to verify its integrity on demand, since the integrity metric would not be available. Further, if the trusted device 24 were accessed after the BIOS program had been accessed, the Boolean value would clearly indicate lack of integrity of the platform.

In step 520, when (or if) accessed as a memory by the main processor 21, the main processor 21 reads the stored native hash instructions 354 from the measurement function 31 in step 525. The hash instructions 354 are passed for processing by the main processor 21 over the data bus 26. In step 530, main processor 21 executes the hash instructions 354 and uses them, in step 535, to compute a digest of the BIOS memory 29, by reading the contents of the BIOS memory 29 and processing those contents according to the hash program. In step 540, the main processor 21 writes the computed digest 361 to the appropriate non-volatile memory location 4 in the trusted device 24. The measurement function 31, in step 545, then calls the BIOS program in the BIOS memory 29, and execution continues in a conventional manner.

Clearly, there are a number of different ways in which the integrity metric may be calculated, depending upon the scope of the trust required. The measurement of the BIOS program's integrity provides a fundamental check on the integrity of a platform's underlying processing environment. The integrity metric should be of such a form that it will enable reasoning about the validity of the boot process—the value of the integrity metric can be used to verify whether the platform booted using the correct BIOS. Optionally, individual functional blocks within the BIOS could have their own digest values, with an ensemble BIOS digest being a digest of these individual digests. This enables a policy to state which parts of BIOS operation are critical for an intended purpose, and which are irrelevant (in which case the individual digests must be stored in such a manner that validity of operation under the policy can be established).

Other integrity checks could involve establishing that various other devices, components or apparatus attached to the platform are present and in correct working order. In one example, the BIOS programs associated with a SCSI controller could be verified to ensure communications with peripheral equipment could be trusted. In another example, the integrity of other devices, for example memory devices or co-processors, on the platform could be verified by enacting fixed challenge/response interactions to ensure consistent results. Where the trusted device 24 is a separable component, some such form of interaction is desirable to provide an appropriate logical binding between the trusted device 14 and the platform. Also, although in the present embodiment the trusted device 24 utilises the data bus as its main means of communication with other parts of the platform, it would be feasible, although not so convenient, to provide alternative communications paths, such as hard-wired paths or optical paths. Further, although in the present embodiment the trusted device 24 instructs the main processor 21 to calculate the integrity metric in other embodiments, the trusted device itself is arranged to measure one or more integrity metrics.

Preferably, the BIOS boot process includes mechanisms to verify the integrity of the boot process itself. Such mechanisms are already known from, for example, Intel's draft "Wired for Management baseline specification v 2.0-BOOT Integrity Service", and involve calculating digests of software or firmware before loading that software or firmware. Such a computed digest is compared with a value stored in a certificate provided by a trusted entity, whose public key is known to the BIOS. The software/firmware is then loaded only if the computed value matches the expected value from the certificate, and the certificate has been proven valid by use of the trusted entity's public key. Otherwise, an appropriate exception handling routine is invoked.

Optionally, after receiving the computed BIOS digest, the trusted device 24 may inspect the proper value of the BIOS digest in the certificate and not pass control to the BIOS if the computed digest does not match the proper value.

Additionally, or alternatively, the trusted device 24 may inspect the Boolean value and not pass control back to the BIOS if the trusted device 24 was not the first memory accessed. In either of these cases, an appropriate exception handling routine may be invoked.

Figure 5:
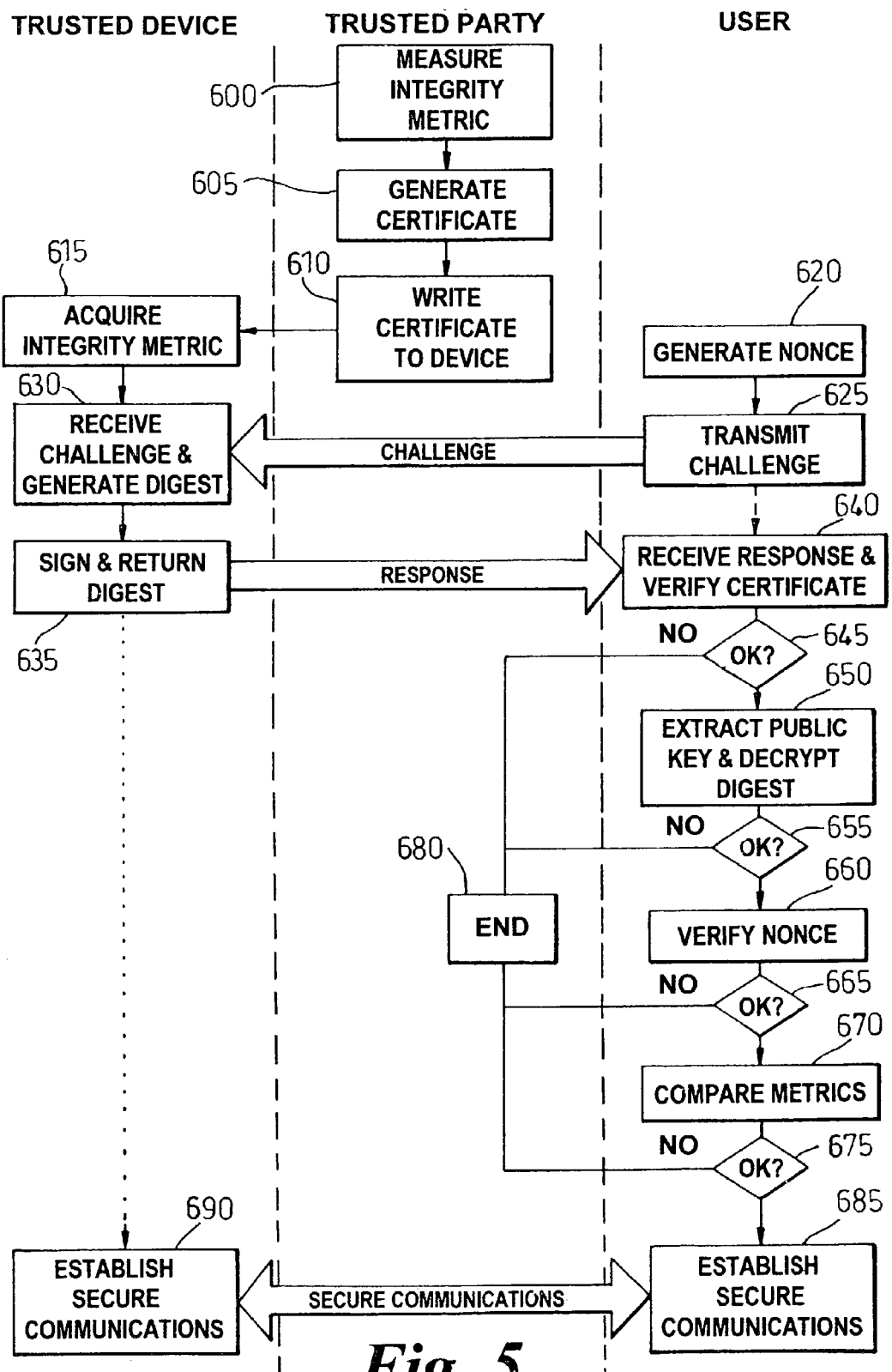
FIG. 5 is a flow diagram that illustrates the steps involved in establishing communications between a trusted computing platform and a remote platform including the trusted platform verifying its integrity.

FIG. 5 illustrates the flow of actions by a TP, the trusted device 24 incorporated into a platform, and a user (of a remote platform) who wants to verify the integrity of the trusted platform. It will be appreciated that substantially the same steps as are depicted in FIG. 5 are involved when the user is a local user. In either case, the user would typically rely on some form of software application to enact the verification. It would be possible to run the software application on the remote platform or the trusted platform. However, there is a chance that, even on the remote platform, the software application could be subverted in some way. Therefore, it is anticipated that, for a high level of integrity, the software application would reside on a smart card of the user, who would insert the smart card into an appropriate reader for the purposes of verification. FIG. 5 illustrates the flow of actions for the general case—a more specific flow of actions for verification by a user smart card will be described with reference to FIG. 6 further below.

At the first instance, a TP, which vouches for trusted platforms, will inspect the type of the platform to decide whether to vouch for it or not. This will be a matter of policy. If all is well, in step 600, the TP measures the value of integrity metric of the platform. Then, the TP generates a certificate, in step 605, for the platform.

The certificate is generated by the TP by appending the trusted device's public key, and optionally its ID label, to the measured integrity metric, and signing the string with the TP's private key.

The trusted device 24 can subsequently prove its identity by using its private key to process some input data received from the user and produce output data, such that the input/output pair is statistically impossible to produce without knowledge of the private key. Hence, knowledge of the private key forms the basis of identity in this case. Clearly, it would be feasible to use symmetric encryption to form the basis of identity. However, the disadvantage of using symmetric encryption is that the user would need to share his secret with the trusted device. Further, as a result of the need to share the secret with the user, while symmetric encryption would in principle be sufficient to prove identity to the user, it would insufficient to prove identity to a third party, who could not be entirely sure the verification originated from the trusted device or the user.

In step 610, the trusted device 24 is initialised by writing the certificate 350 into the appropriate non-volatile memory locations 3 of the trusted device 24. This is done, preferably, by secure communication with the trusted device 24 after it is installed in the motherboard 20. The method of writing the certificate to the trusted device 24 is analogous to the method used to initialise smart cards by writing private keys thereto. The secure communications is supported by a 'master key', known only to the TP, that is written to the trusted device (or smart card) during manufacture, and used to enable the writing of data to the trusted device 24; writing of data to the trusted device 24 without knowledge of the master key is not possible.

At some later point during operation of the platform, for example when it is switched on or reset, in step 615, the trusted device 24 acquires and stores the integrity metric 361 of the platform.

When a user wishes to communicate with the platform, in step 620, he creates a nonce, such as a random number, and, in step 625, challenges the trusted device 24 (the operating system of the platform, or an appropriate software application, is arranged to recognise the challenge and pass it to the trusted device 24, typically via a BIOS-type call, in an appropriate fashion). The nonce is used to protect the user from deception caused by replay of old but genuine signatures (called a 'replay attack') by untrustworthy platforms. The process of providing a nonce and verifying the response is an example of the well-known 'challenge/response' process.

In step 630, the trusted device 24 receives the challenge and creates an appropriate response. This may be a digest of the measured integrity metric and the nonce, and optionally its ID label. Then, in step 635, the trusted device 24 signs the digest, using its private key, and returns the signed digest, accompanied by the certificate 350, to the user.

In step 640, the user receives the challenge response and verifies the certificate using the well known public key of the TP. The user then, in step 650, extracts the trusted device's 24 public key from the certificate and uses it to decrypt the signed digest from the challenge response. Then, in step 660, the user verifies the nonce inside the challenge response. Next, in step 670, the user compares the computed integrity metric, which it extracts from the challenge response, with the proper platform integrity metric, which it extracts from the certificate. If any of the foregoing verification steps fails, in steps 645, 655, 665 or 675, the whole process ends in step 680 with no further communications taking place.

Assuming all is well, in steps 685 and 690, the user and the trusted platform use other protocols to set up secure communications for other data, where the data from the platform is preferably signed by the trusted device 24.

Further refinements of this verification process are possible. It is desirable that the challenger becomes aware, through the challenge, both of the value of the platform integrity metric and also of the method by which it was obtained. Both these pieces of information are desirable to allow the challenger to make a proper decision about the integrity of the platform. The challenger also has many different options available—it may accept that the integrity metric is recognised as valid in the trusted device 24, or may alternatively only accept that the platform has the relevant level of integrity if the value of the integrity metric is equal to a value held by the challenger (or may hold there to be different levels of trust in these two cases).

The techniques of signing, using certificates, and challenge/response, and using them to prove identity, are well known to those skilled in the art of security and therefore need not be described in any more detail herein.

Figure 6:
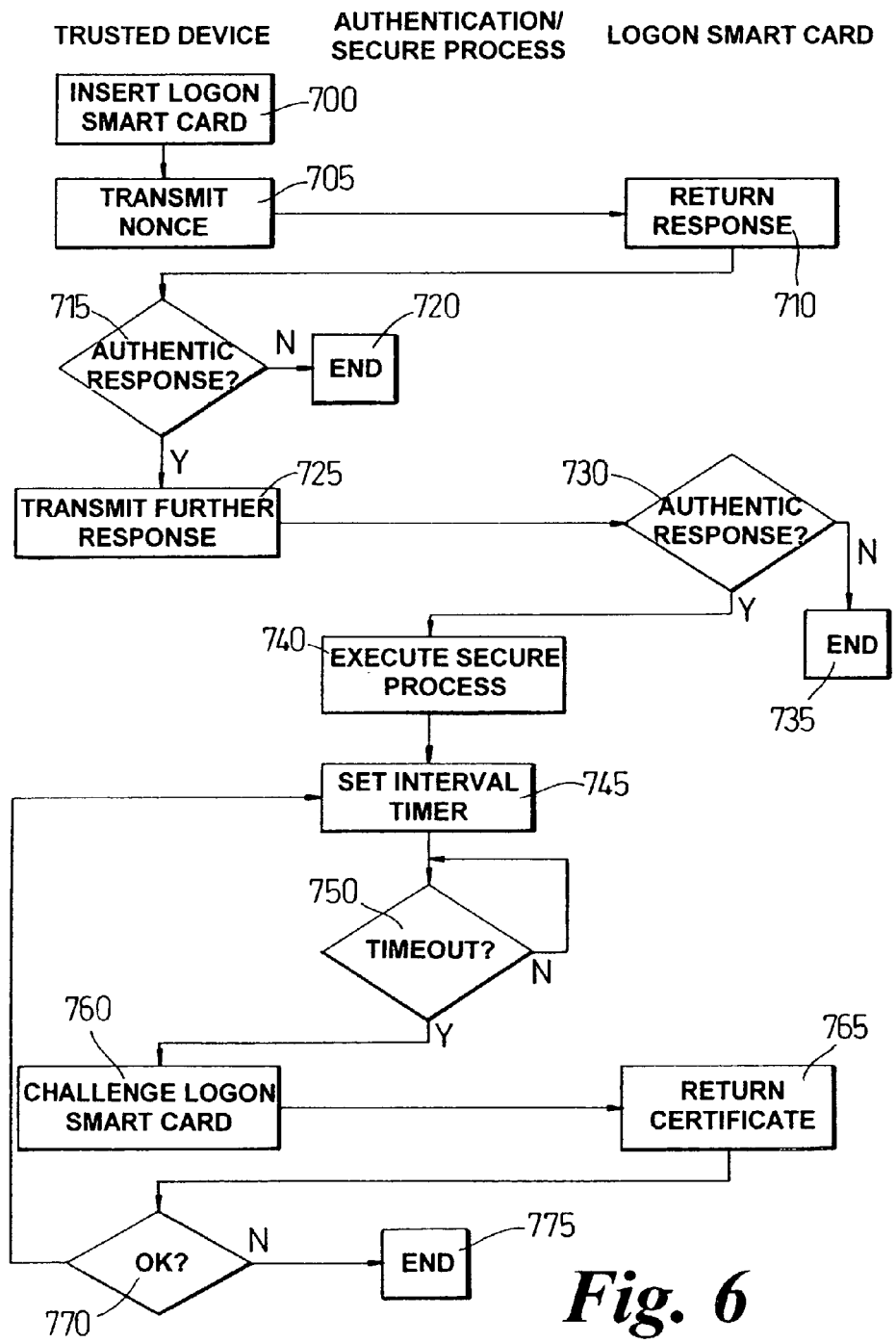
FIG. 6 is a flow diagram that illustrates the steps involved in verification of a trusted computing platform by a potential user of that platform by means of a smart card.

As indicated above, FIG. 6 shows the flow of actions in an example of verification of platform integrity by a user interacting with the trusted platform with a smart card 19. As will be described, the process conveniently implements a challenge/response routine. There exist many available challenge/response mechanisms. The implementation of an authentication protocol used in the present embodiment is mutual (or 3-step) authentication, as described in ISO/IEC 9798-3, "Information technology—Security techniques—Entity authentication mechanisms; Part 3; Entity authentication using a public key algorithm", International Organization for Standardization, November 1993. Of course, there is no reason why other authentication procedures cannot be used, for example 2-step or 4-step, as also described in this reference.

By using a high availability cluster in which each System Processing Unit (SPU) has a TD, we can gain more trust and a more flexible approach to trust, while maintaining the high availability properties of the cluster. In particular we can (a) detect when a system has got into an untrusted state and roll back to a trusted state (b) try an action whose outcome the system is unsure of (unsure in terms of whether the system will be trusted or not afterwards, and roll back if it leads to an untrusted state (c) move to an untrusted state for a task or a period of time, then return to a trusted state.

One of the advantages of this solution is that it exploits the high availability features to improve the trust of the overall system, whereas normally high availability and trust or security features do not interact well and tend to interfere with each other's operations.

Figure 7:
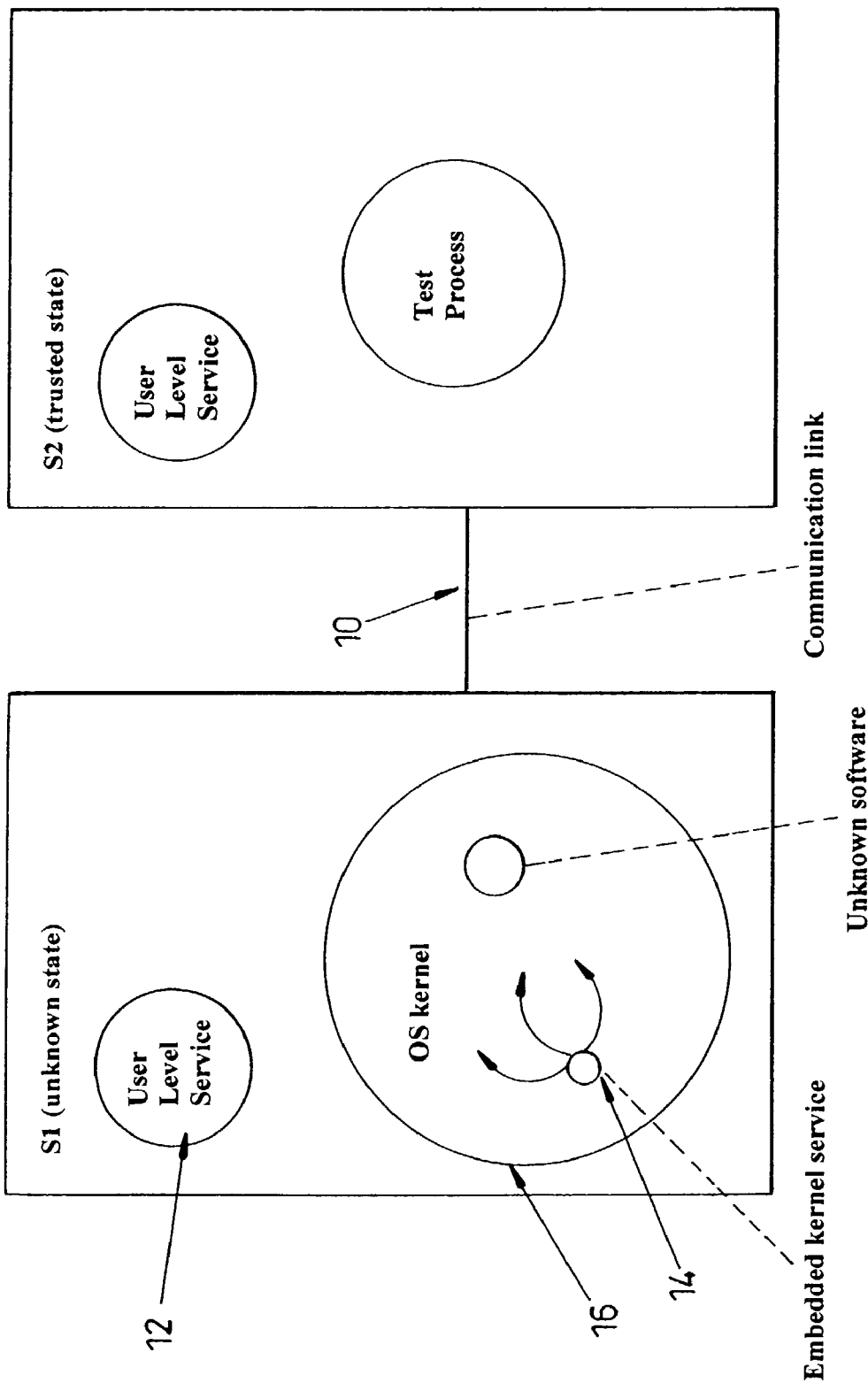
FIG. 7 is a schematic diagram of first and second S* processing units (SPU) and the connection between them.

FIG. 7 shows an embodiment of the invention operable to implement a computer system that allows roll-back to a trusted state. The system comprises two SPUs S1 and S2 having a communication link 10 between them. The system has the following requirements.

Additional integrity metrics beyond those described in the TCPA specification. These metrics are determined by a separate platform-in a cluster with two SPU's, S1 and S2, some integrity metrics for S1 are determined by S2. These are heuristic, not absolute tests. Some examples are given below. S2 digitally signs its test results with its TPM, including the state of S2 at the time the tests were carried out. S1 can report the results from S2 as part of its integrity metrics, when queried by a client.

MC/ServiceGuard supports "rolling upgrades", see section entitled "Rolling Upgrades" in the annexed supporting information on pages 30 to 47.

To achieve the roll-back referred to above the following steps are taken.

This can be under the control of S2 or a management station or a human administrator.

1. Move applications from S1 to S2. Clients are directed to connect to S2 and not S1.
2. Load the unknown software or kernel driver on S1.
3. S2 performs tests on the integrity of S1, and records the results. Because S2 is in a known trusted state, it can be trusted to carry out the tests on S1 correctly and record and report the results.
4. If S1 passes the tests,
   4.1. S2 signs test results and a copy of its own integrity metrics, using its TPM/TD, and transmits them to S1.
   4.2. S1 records this as one of its integrity metrics, and can provide them to any client who queries S1 in the future.
   4.3. Move applications back to S1.
   4.4. Load the (previously unknown) software on S2, bringing S2 into the same state as S1.
   4.5. S2 may use its original test results of S1 as one of its integrity metrics, or S1 may now carry out equivalent tests on S2 and S2 may incorporate those results in its integrity metrics.
   4.6. Move some applications back to S2.
5. If S1 fails the tests, either
   a) Reboot S1, and load appropriate software until it is in the same state as S2 (known to be trusted) and move some applications back to S1, or
   b) Finish open transactions on S2. Save a copy to the shared disk (SPUs in a cluster have access to shared non-volatile storage, i.e. disks and other media.) of the active state of S2, as done using standard features of current laptop computers. Restore this state to S1. Allocate appropriate applications to S1 and S2.

The result of this sequence is that the cluster, which supports TCPA, is able to load the unknown software (kernel-level driver) into one of its SPUs' OS kernels, run some tests to determine the integrity of that SPU, and depending on the results of that test either effectively roll the whole cluster forward so that software is loaded on all SPUs or roll back to the previous state where the software was not loaded. In either case, at the end of the sequence, all SPUs are able to use the normal TCPA mechanisms to report integrity metrics to a client to prove they are in a suitably trusted state.

The particular relevance of the kernel driver is that it is loaded into a running OS kernel, and that this gives it access to kernel memory, where (if it is malicious or badly designed) it might be able to interfere with data in the kernel and with the kernel's operation and also to interfere with any tests the kernel or applications might carry out to check that the OS and the overall system are in a trusted state and operating correctly. Thus once an untrusted kernel driver is loaded the system must be considered in an untrusted state, and cannot be normally brought back to a trusted state (short of rebooting), even by unloading the untrusted driver (because that wouldn't undo any damage).

As shown in FIG. 7, there must be a communication link 10 between S1 and S2, and S2 must be in a known trusted state. The following are heuristic tests-they are not guaranteed to catch all malicious software, and they can be improved upon. Nevertheless, they may provide useful metrics to judge whether or not to trust the platform for certain applications or contexts.

The first test is as follows. Nominate or create a user level service 12 on S1. The test process on S2 connects to the service and makes a series of requests. The results are compared either with the results from an identical service running on S2 or with results from running the same test previously when S1 was in a known trusted state. If the results are significantly different, or the time taken to respond is significantly different, or if S1 makes network connections or sends network traffic to an unexpected destination (or perhaps to any destination other than S2) during or after the test, we may say that S1 has failed the test and is considered untrusted. As an alternative, if a third machine is available and in a trusted state, it may make the requests to S1 and S2 may observe the results and the network traffic.

The second test is as follows. A very simple service 14 is embedded in the OS kernel 16 of S1. It has direct access to kernel memory, and it responds to a request simply by recovering the value stored in a specific area in kernel memory or a specific table in kernel memory, or by computing a cryptographic hash on an area or table in kernel memory, or by executing the code in a particular area in kernel memory. The area or table or position of the code is contained in the request to the service. The test comprises a number of requests from the test process on S2 to the embedded kernel service on S1. For reasons of speed, the test process may not request all of kernel memory or all tables, but choose a random subset. The results are compared either with results for the same requests on S2 or with results for the same requests previously sent to S1 when it was in a known trusted state. In either case, if the unknown software has interfered with sensitive areas of kernel memory on S1 after being loaded, there is a high probability of detecting this. Since the information about what parts of kernel memory will be checked is nowhere stored on S1, it is not possible for the unknown software to have this information and not simple for it to subvert this test. Again, the test process may want to compare not only the results of requests, but also the time taken to respond, and even the time taken to respond to requests to the user level service. This helps to detect when the unknown software has tried to subvert the embedded kernel service and made copies of any area of kernel memory it has interfered with, because we would expect kernel memory to expand and the response time to be different.

Although the above has been described with the TCP patent specification and the TCPA specification as an example of a trusted device, the invention is also applicable to other types of trusted computing device.

Annex with Supporting Information

Creating a High Availability Cluster

Eliminating the SPU as a Single Point of Failure

The SPU in an HP 9000 system consists of a group of elements, any of which can fail. The most important are:

One or more central processing units (CPUs)

I/O controllers

Memory boards

If a failure in one of these components takes place, the system typically undergoes a reboot, after which a system start-up test will map out any failed components. Thus, even the stand-alone system has a degree of availability provided by this self-diagnosis. However, the loss of service during this reboot time may be unacceptable. Moreover, the system must eventually be brought down for repairs, which require additional downtime.

The use of cluster architecture lets you eliminate the SPU as a single point of failure. A cluster eliminates the downtime associated with SPU failure, allowing you to repair or replace failed components without losing service. In an HA cluster, one or more systems act as backups to the SPU's of the system on which the application primarily runs. These backup systems can be either active or standby systems. Active systems run their own applications while serving as the backup for another system. Standby systems may be idle until a failover occurs, or they can be used for other processing.

Figure 8:
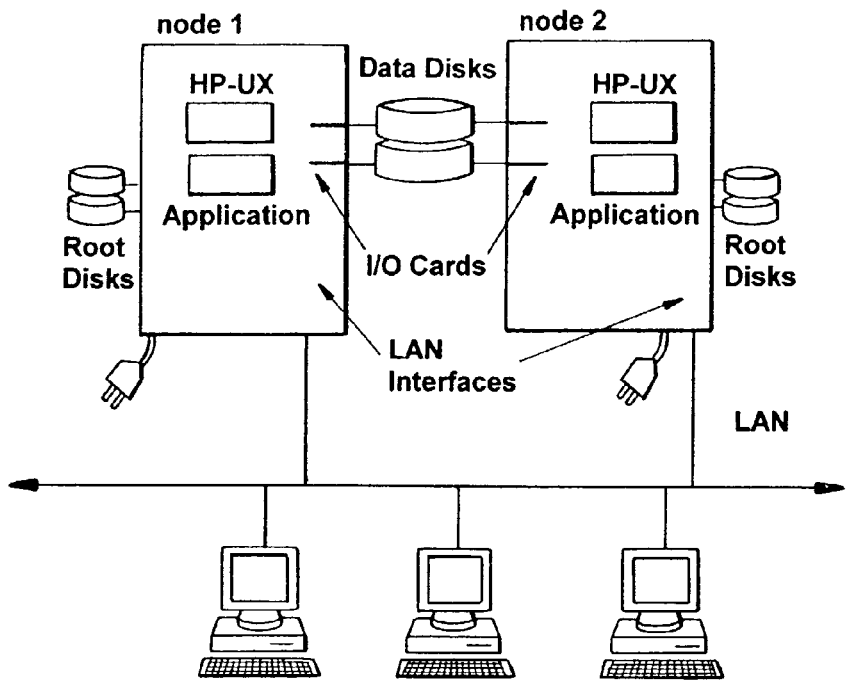
FIG. 8 shows a simple cluster containing two System Processing Units.
Figure 9:
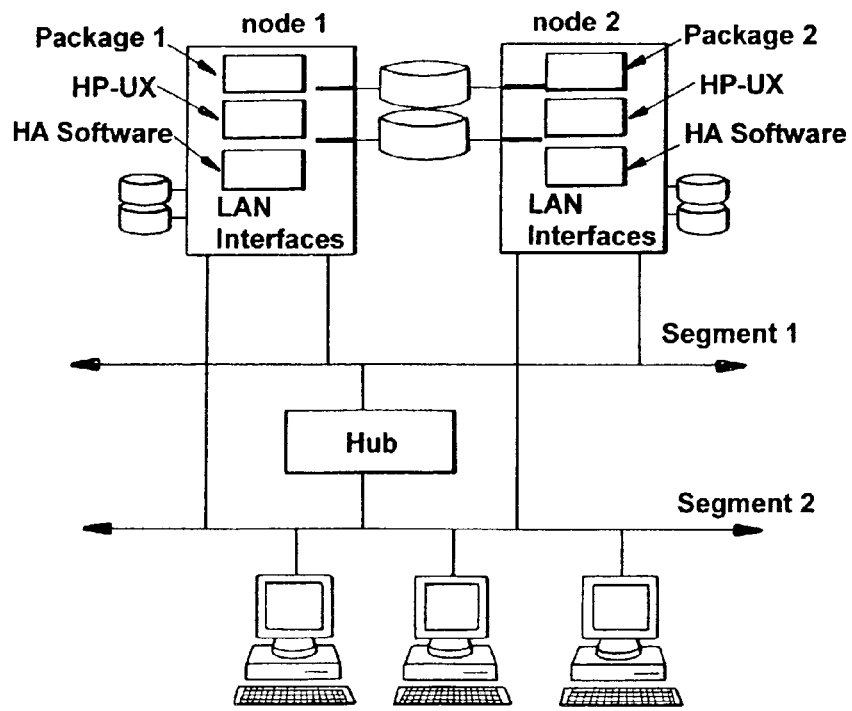
FIG. 9 shows a high availability cluster formed from two System Processing Units.

FIG. 8 shows the addition of a second system, including SPU, to the reliable system described earlier. The result is a simple cluster, and the individual hosts are known as nodes. Note the distinction between node and SPU. The SPU is a system processor unit containing one or more central processing units (CPUs), memory, and a power supply. A node is a host system which is a member of a cluster. The SPU is a component within the node.

The two nodes are connected to each other by a local area network, which allows them to accept client connections and to transmit messages that confirm each other's health. If one node's SPU should fail, the other node can start up after only a brief delay, in a process known as failover. After the failover, clients can access the second node as easily as the first.

The process of failover is handled by special high availability software running on all nodes in the cluster. Different types of clusters use different cluster management and failover techniques. The specific differences in cluster types and their HA software are described in more detail in the chapter "HP's High Availability Cluster Solutions."

Creating a High Availability Cluster

Note that the data disks are physically connected to both nodes, so that data is also accessible by the other node in the event of failover. Each node in a cluster has its own root disks, but each node may also be physically connected to several other disks in such a way that multiple nodes can access the data. On HP systems, this cluster-oriented access is provided by the Logical Volume Manager. Access may be exclusive or shared, depending on the kind of cluster you are creating. All disks that are intended for cluster use must be connected to the primary node and to all possible alternate nodes.

Implementing the High Availability Cluster

A high availability cluster is a grouping of servers having sufficient redundancy of software and hardware components that a failure will not disrupt the availability of computer services. The result of eliminating single points of failure in power, disk, SPU, networking, and software is a true high availability cluster, shown in FIG. 9.

Creating a High Availability Cluster

In this composite figure (FIG. 9), we see a two-node configuration with a two-LAN grouped subnet and mirrored individual root and data disks. Application programs run as part of packages on each node. If there is a failure of a component on one node, the package may start up on the other node.

The task of implementing this cluster is a fairly straightforward process of configuring hardware and software components. The details vary somewhat, depending on the components you select. Most of the products described in the rest of this book were developed to support this fairly simple cluster model. Although there are differences in the way different kinds of failover behaviour are implemented, the cluster configuration itself remains common to all HA cluster types.

Complete High Availability Solution

To develop a complete high availability solution, you need to maintain high availability within a hierarchy of system levels, some of which go beyond the cluster level. Failures at all levels must be detected quickly and a fast response provided. At the same time, planned maintenance events at all levels must be possible with minimum disruption of service.

The following table shows a hierarchy of system levels where HA planning is necessary.

TABLE 2.2

| System Level | Levels of Availability How High Availability is Achieved |
|---|---|
| Cluster Level | Communication among nodes must be highly available. Data must be protected. There must be multiple nodes capable of running applications. |
| Server (Host) Level | SPU must be redundant; dual I/O paths to the data must be provided. |
| Operating System Level | Mirroring of system software must be implemented. |
| System and Network Management Level | Distributed system administration and network monitoring tools must be made highly available. |
| Transaction Processing Level | Transaction monitors and all the services they use must be highly available. |
| Database Level | Database must be capable of starting up on a different node or must run on more than on node at the same time. |
| Application Level | Applications must be robust and capable of recovering from errors. Applications and/or TP monitors must be capable of switching to another processor. |
| Firmware Level | Error correction must be incorporated. |
| Hardware Component Level | Switching techniques must be provided. |

HP's High Availability Cluster Components

Choosing HA Architectures and Cluster Components

The cluster shown so far in this book is a generic loosely coupled grouping of HP 9000 systems. In fact, each SPU can be connected to another SPU in a variety of highly available cluster configurations. Three basic types are:

Active/standby configuration. An active/standby configuration is one in which a standby SPU is configured to take over after the failure of another SPU that is running a mission critical application. In an active/standby configuration, two or more SPUs are connected to the same data disks; if one SPU fails, the application starts on the standby. The failed system can then be serviced while the application continues on the standby system. In the active/standby configuration, the backup node may be idle or it may be running another less important application. HP's MC/ServiceGuard product provides the active/standby capability.

Active/active configuration. An active/active configuration is one in which several nodes may be running mission critical applications, and some can serve as backups for others while still running their own primary applications. HP's MC/ServiceGuard product also provides the active/active capability.

Parallel database configuration. A parallel database configuration is a cluster in which the different nodes each run separate instances of the same database application and all access the same database concurrently. In this configuration the loss of a single node is not critical, since users can connect to the same application running on another node. HP's MC/Lockmanager product provides the parallel database implementation for use with Oracle Parallel Server.

The following sections describe HP's implementations of each of these cluster architectures.

Active/Standby Configurations Using MC/ServiceGuard

Figure 10:
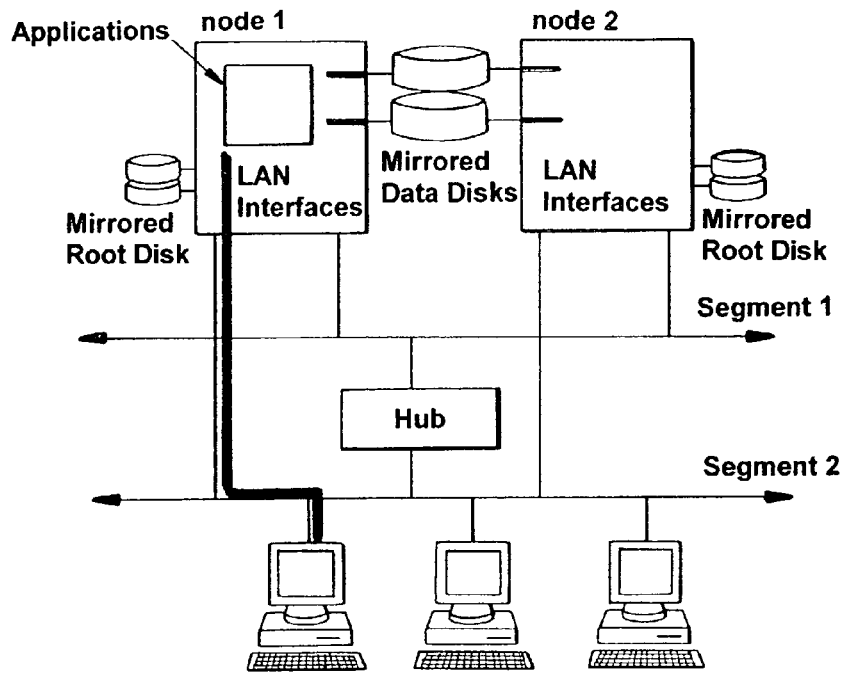
FIG. 10 shows a high availability cluster in an active/standby configuration before failover

A flexible active/standby configuration is provided by MC/ServiceGuard, which allows the application to start on the standby node quickly, without the need for a reboot. In addition, non-MC/ServiceGuard applications run on the alternate system and continue running after failover. FIG. 10 shows a two-node active/standby configuration using MC/ServiceGuard. Applications are running on node 1, and clients connect to node 1 through the LAN.

In this configuration, the first node is running the application, having obtained exclusive access to the data disks. The second node is essentially idle, though the operating system and the high availability software are both running.

Figure 11:
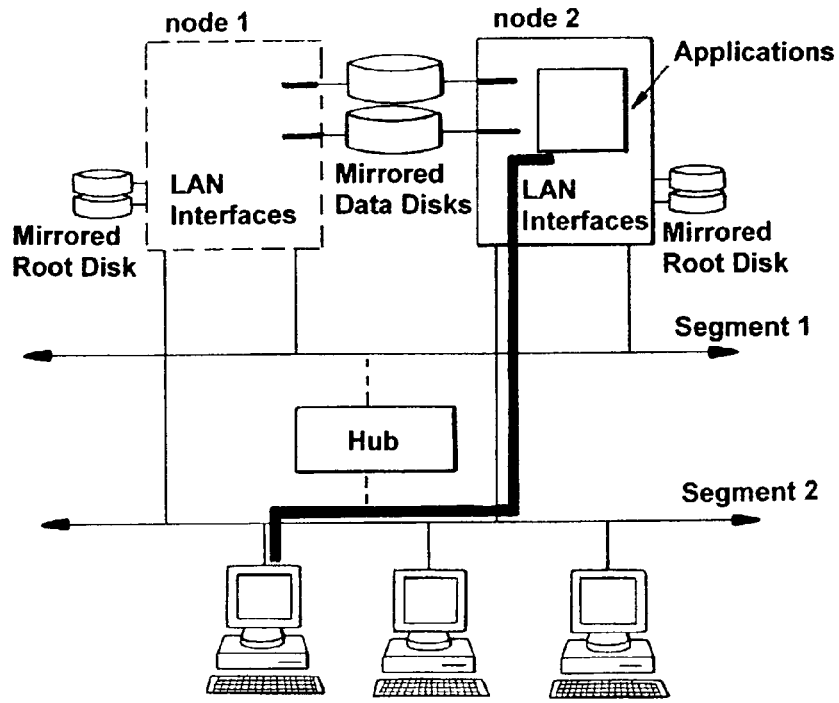
FIG. 11 shows a high availability cluster in an active/standby configuration after failover.

The state of the system following failover is shown in FIG. 11. After failover, the applications start up on node 2 after obtaining access to the data disks. Clients can reconnect to node 2.

Note that failure is not necessary for a package to move within the cluster. With MC/ServiceGuard, the system administrator can move a package from one node to another at any time for convenience of administration. Both nodes remain up and running following such a voluntary switch.

Choosing HA Architectures and Cluster Components

The primary advantage of the active/standby configuration is that the performance of the application is not impaired after a switch to the standby node; all the resources of the standby node are available to the application.

Active/Active Configurations Using MC/ServiceGuard

Figure 12:
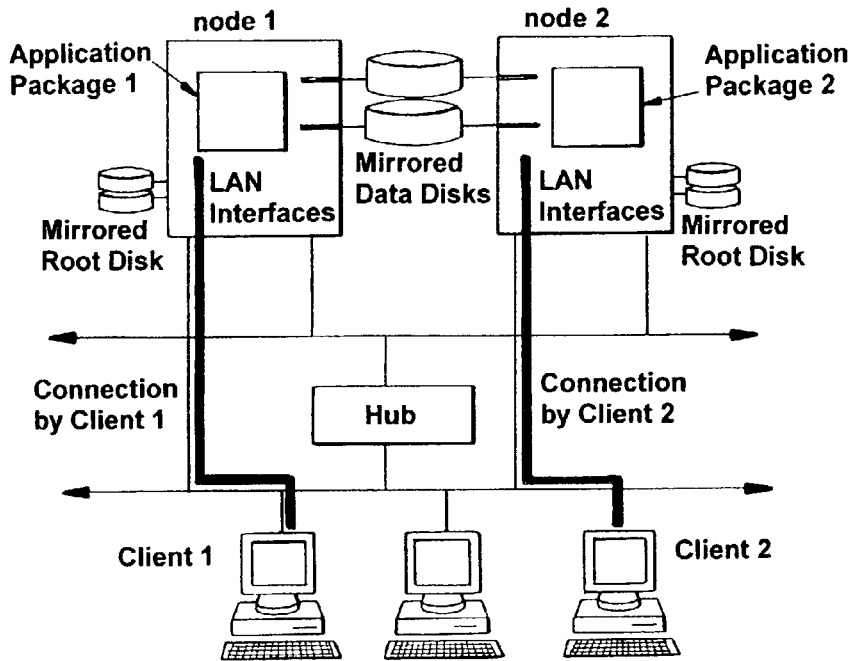
FIG. 12 shows a high availability cluster in an active/active configuration before failure of one host.

In the active/active configuration, two or more SPUs are 0—physically connected to the same data disks, and if there is a failure of one SPU, the applications running on the failed system start up again on an alternate system. In this configuration, application packages may run on all nodes at the same time. FIG. 12 shows a two-node active/active configuration before the failure of one host. Different applications are running on both nodes.

Figure 13:
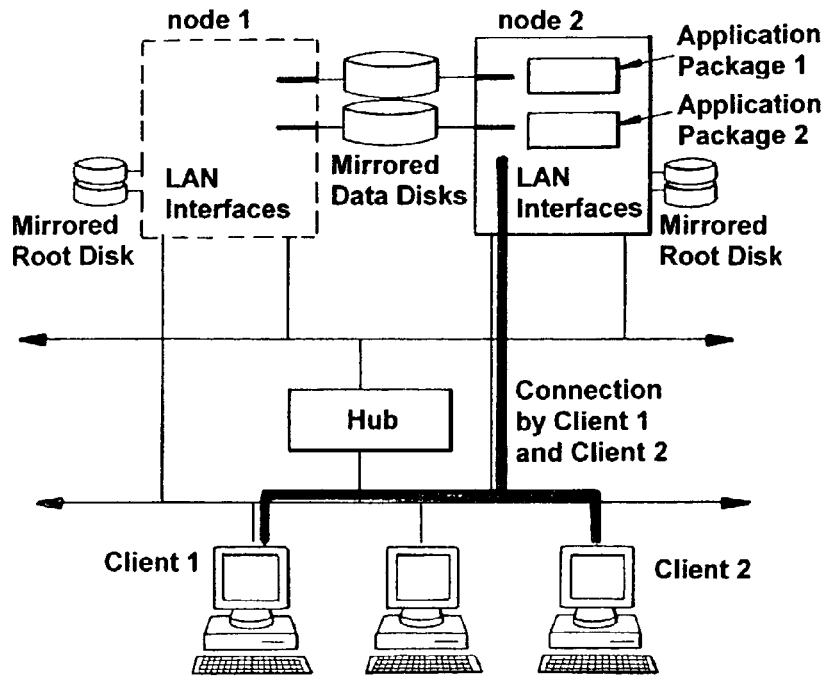
FIG. 13 shows a high availability cluster in an active/standby configuration after failure of one host.

FIG. 13 shows an active/active configuration following the failure of one host. The second node still carries on with the applications that were previously running, but it now also carries the application that had been running on node 1 before the failure.

In the active/active configuration, MC/ServiceGuard does not use a dedicated standby system. Instead, the applications that were running on the failed node start up on alternate nodes while other processing on those alternate nodes continues.

How MC/ServiceGuard Works

Applications, together with disk and network resources used by applications, are configured in packages which can run on different systems at different times. Each package has one or more application services which are monitored by MC/ServiceGuard; in the event of an error in a service, a restart or a failover to another node may take place. A particular benefit of MC/ServiceGuard is that you can configure failover to take place following the failure of a package, or following the failure of individual services within a package. You can also determine whether to try restarting services a number of times before failover to a different node.

With MC/ServiceGuard there need not be any idle systems; all of the nodes can run mission critical applications If one node fails, the applications it supports are moved and join applications that are in progress on other other nodes.

Under normal conditions, a fully operating MC/ServiceGuard cluster simply monitors the health of the cluster's components while the packages are running on individual nodes. Any node running in the MC/ServiceGuard cluster is called an active node. When you create the package, you specify a primary node and one or more adoptive nodes. When a node or its network communications fails, MC/ServiceGuard can transfer control of the package to the next available adoptive node.

The primary advantage of the active/active configuration is efficient use of all computing resources during normal operation. But during a failover, performance of applications on the failover node will be somewhat impacted. To minimize the impact of failover on performance, ensure that each node has the appropriate capacity to handle all applications that might start up during a failover situation.

Use of Relocatable IP Addresses

Clients connect via LAN to the server application they need. This is done by means of IP addresses: the client application issues a connect ( ) call, specifying the correct address. Ordinarily, an IP address is mapped to an individual hostname that is, a single HP-UX system. In MC/ServiceGuard, the IP address is assigned to a package and is temporarily associated with whatever host system the package happens to be running on. Thus the client's connect ( ) will result in connection to the application regardless of which node in the cluster it is running on.

Figure 14:
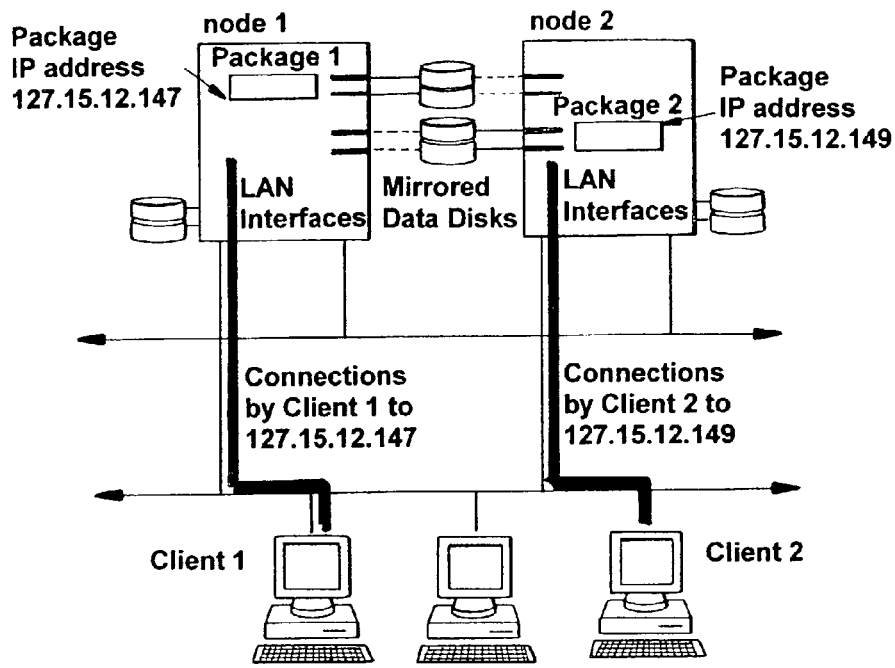
FIG. 14 shows a cluster with separate packages running on two nodes before node failure.

FIG. 14 shows a cluster with separate packages running on each of two nodes. Client 1 connects to a package by its IP address. The package is shown running on node 1, but the client need not be aware of this fact.

Figure 15:
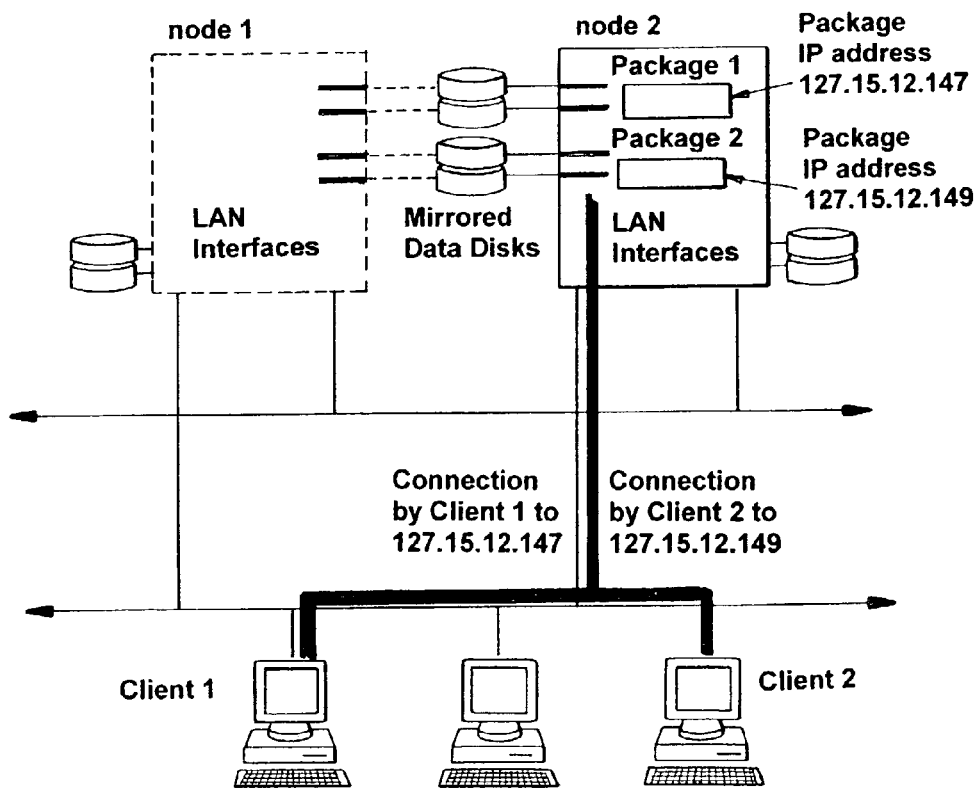
FIG. 15 shows a cluster with separate packages running on two nodes after node failure.

After a failure on node 1, the package moves over to node 2. The resulting arrangement of packages is shown in FIG. 15. Note that the IP address of the package is the same.

The key benefit of using relocatable IP addresses with packages is transparency. The client is unconcerned with which physical server is running a given application. In most cases, no client or server code changes are needed to take advantage of relocatable IP addresses.

Application Monitoring

Central to the functioning of MC/ServiceGuard is the monitoring of user applications. When a package starts, its applications are started with a special cluster command that continues to monitor the application as long as it is running. The monitor immediately detects any error exit from the application and alerts MC/ServiceGuard. Depending on the kind of error condition, MC/ServiceGuard can restart the application, halt the application, or fail it over to a different node.

Fast Recovery from LAN Failures

MC/ServiceGuard monitors the status of the LANs used within each node of the enterprise cluster. If any problem affects the LAN, MC/ServiceGuard will quickly detect the problem and activate a standby LAN within the same node. This detection and fast switch to an alternate LAN is completely transparent to the database and attached clients. This feature eliminates the downtime associated with LAN failures and further strengthens the enterprise cluster environment for supporting mission critical applications.

Workload Balancing

The use of application packages provides an especially flexible mechanism for balancing workload within the cluster after a node failure. Individual application packages within a single node can be moved to different alternate nodes, distributing the workload of one node across the surviving nodes of the cluster. For example, a cluster with four nodes is configured and each node is running three packages. If a node fails, each of the three packages running on that node can be moved to a different node. This distributes the workload of the failed node among all of the remaining nodes of the cluster and minimizes the performance impact on the other applications within the cluster.

This same package capability also allows the workload of a cluster to be balanced according to the processing demands of different applications. If the demand of one application package becomes too high, the system administrator can move other application packages on the same node to different nodes in the cluster by using simple commands, thus freeing processing power on that node for meeting the increased demand.

Workload tuning within individual nodes of an enterprise cluster can be further refined by using HP's Process Resource Manager (HP PRM), described in a later section.

Rolling Upgrades

Another useful feature of MC/ServiceGuard is the ability to upgrade the software on a given node including the operating system and the high availability software—without bringing down the cluster. You carry out the following steps for every node in the cluster:

1. Move applications from the node that is to be upgraded to some other node in the cluster.
2. Remove the node from the cluster.
3. Perform the upgrades
4. Allow the node to rejoin the cluster.
5. Move applications back to the upgraded node.

When using this feature of MC/ServiceGuard, you must carefully plan the capacity of the nodes in the cluster so that moving an application from one node to another during upgrades will not degrade performance unacceptably.

Parallel Database Configuration Using MC/LockManager

In the parallel database configuration, two or more SPUs are running applications that read from and write to the same database disks concurrently. This is the configuration used on HP clusters by Oracle Parallel Server (OPS), a relational database product provided by Oracle Corporation. OPS works in conjunction with HP's MC/LockManager software.

In the event one MC/LockManager node fails, another is still available to process transactions while the first is serviced.

What is claimed is:

1. A computer system comprises at least two computing platforms (S1, S2) each having a trusted device (TD), the computing platforms (S1, S2) having a communications link (10) therebetween, wherein the system is operable
    to move one or more applications from a first of the computing platforms (S1) to a second of the computing platforms (S2);
    to load software onto said first computing platform (S1);
    to perform integrity tests on the first platform (S1); and
    if the integrity tests are passed the system is operable to move the application back to the first computing platform (S1) and load the software onto the second platform (S2); and
    if the integrity tests are failed the system is operable to return the first computing platform (S1) to the state of the second computing platform (S1).

2. A computer system as claimed in claim 1, which is operable to load software unknown to the computer system, which software is unknown in that the software does not have a trusted status with the computer system.

3. A computer system as claimed in claim 1, which is operable to perform the integrity tests with the second platform (S2).

4. A computer system as claimed in claim 1, in which the second computing platform (S2) is operable to digitally sign the results of the integrity tests with its TD.

5. A computer system as claimed in claim 1, in which in the event of the first computing platform (S1) failing the integrity tests, the first computing platform (S1) is operable to be rebooted.

6. A computer system as claimed in claim 1, in which in the event of the first computing platform (S1) failing the integrity tests, the system may be operable to complete open transactions between third parties and the second computing platform (S2), to save a copy of the active state of the second computing platform (S2) and restore that active state to the first computing platform (S1).

7. A method of maintaining a trusted state in a computer system comprises:
    moving one or more applications from a first computing platform (S1) having a trusted device (TD) to a second computing platform (S2) having a TD by a communications link (10) of the communication system;
    loading software onto the first computing platform (S1);
    performing integrity tests on the first computing platform (S1); and
    if the integrity tests are passed the applications are moved back to the first computing platform (S1) and the software is loaded onto the second platform (S2);
    if the integrity tests are not passed the first computing platform (S1) is returned to the state of the second computing platform (S2).

8. A method as claimed in claim 7, in which the software is unknown to the computer system.

9. A method as claimed in claim 7, in which the integrity tests are performed by the second computing platform (S2).

10. A method as claimed in claim 7, in which the tests involve a comparison with previous results obtained from the first computing platform (S1).

11. A method as claimed in claim 7, in which the tests involve a comparison with the results of the same tests run on the second platform (S2).

12. A method as claimed in claim 7, in which the second computing platform (S2) digitally signs the results of the integrity tests with its TD.

13. A method as claimed in claim 12, in which the first platform (S1) uses the signed results as an integrity metric.

14. A computer system programmed to perform a method of maintaining a trusted state in the computer system, comprising the following steps:
    moving one or more applications from a first computing platform to a second computing platform by a communications link of the communication system;
    loading software onto the first computing platform;
    performing integrity tests on the first computing platform; and
    if the integrity tests are passed the applications are moved back to the first computing platform and the software is loaded onto the second platform;
    if the integrity tests are not passed the first computing platform is returned to the state of the second computing platform.

15. A medium carrying a program operable to perform a method of maintaining a trusted state in a computer system, comprising the following steps:
- moving one or more applications from a first computing platform to a second computing platform by a communications link of the communication system;
- loading software onto the first computing platform;
- performing integrity tests on the first computing platform; and
- if the integrity tests are passed the applications are moved back to the first computing platform and the software is loaded onto the second platform;
- if the integrity tests are not passed the first computing platform is returned to the state of the second computing platform.

16. The computer system as claimed in claim 14, wherein the software is unknown to the computer system.

17. The computer system as claimed in claim 14, wherein the integrity tests are performed by the second computing platform.

18. The computer system as claimed in claim 14, wherein the tests involve a comparison with previous results obtained from the first computing platform.

19. The computer system as claimed in claim 14, wherein the tests involve a comparison with the results of the same tests run on the second platform.

20. The computer system as claimed in claim 14, wherein the second computing platform digitally signs the results of the integrity tests with a trusted device.

21. The computer system as claimed in claim 20, wherein the first platform uses the signed results as an integrity metric.

22. The medium as claimed in claim 15, wherein the software is unknown to the computer system.

23. The medium as claimed in claim 15, wherein the integrity tests are performed by the second computing platform.

24. The medium as claimed in claim 15, wherein the tests involve a comparison with previous results obtained from the first computing platform.

25. The medium as claimed in claim 15, wherein the tests involve a comparison with the results of the same tests run on the second platform.

26. The medium as claimed in claim 15, wherein the second computing platform digitally signs the results of the integrity tests with a trusted device.

27. The medium as claimed in claim 26, wherein the first platform uses the signed results as an integrity metric.

* * * * *